United States Patent
Weckerling et al.

(10) Patent No.: US 8,251,829 B2
(45) Date of Patent: Aug. 28, 2012

(54) CONSTANT VELOCITY BALL JOINT IN THE FORM OF A COUNTER TRACK JOINT

(75) Inventors: Thomas Weckerling, Bonn (DE); Nader Khoshoei, Lohmar (DE); Ramon Amenabar, Gipuzkoa (ES); Xabier Ureta, Gipuzkoa (ES); Jose M. Cubert, Gipuzkoa (ES); Inaki Gutierrez, Gipuzkoa (ES)

(73) Assignee: GKN Driveline International, GmbH, Lohmar (DE)

( * ) Notice: Subject to any disclaimer, the term of this patent is extended or adjusted under 35 U.S.C. 154(b) by 416 days.

(21) Appl. No.: 12/445,427

(22) PCT Filed: Oct. 13, 2006

(86) PCT No.: PCT/EP2006/009893
§ 371 (c)(1),
(2), (4) Date: Dec. 11, 2009

(87) PCT Pub. No.: WO2008/043384
PCT Pub. Date: Apr. 17, 2008

(65) Prior Publication Data
US 2010/0113167 A1    May 6, 2010

(51) Int. Cl.
*F16D 3/224* (2011.01)

(52) U.S. Cl. ......................................... 464/145; 464/905

(58) Field of Classification Search .................. 464/145, 464/906
See application file for complete search history.

(56) References Cited

U.S. PATENT DOCUMENTS
2004/0137991 A1 *  7/2004  Weckerling

FOREIGN PATENT DOCUMENTS
| | | |
|---|---|---|
| DE | 10060220 | 6/2002 |
| DE | 10220711 | 11/2003 |
| DE | 10337612 | 6/2004 |
| DE | 102004018777 A1 | 3/2005 |
| FR | 2799519 | 4/2001 |
| WO | WO-0161203 | 8/2001 |
| WO | WO-03064876 | 8/2003 |
| WO | WO-2005028895 | 3/2005 |
| WO | WO-2006048032 | 5/2006 |

OTHER PUBLICATIONS
International Search Report from PCT/EP2006/009893 (3 pages).

* cited by examiner

*Primary Examiner* — Gregory Binda
(74) *Attorney, Agent, or Firm* — Rader, Fishman & Grauer PLLC

(57) ABSTRACT

A constant velocity ball joint is disclosed. The constant velocity ball joint may be a counter track joint, and may include first and second track pairs that form an opposite opening angle. The first track pairs may be provided with a track inflection point. The second track pairs may each form a second track centerline that has a path other than a singular circular path in a section between the central joint plane and the connection side.

12 Claims, 8 Drawing Sheets

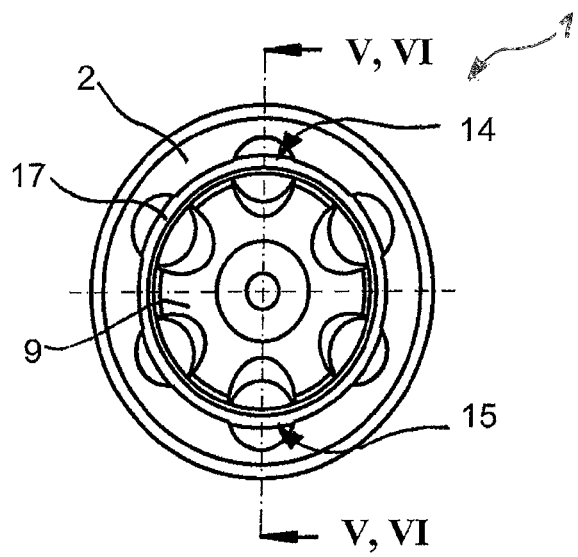
FIG. 4
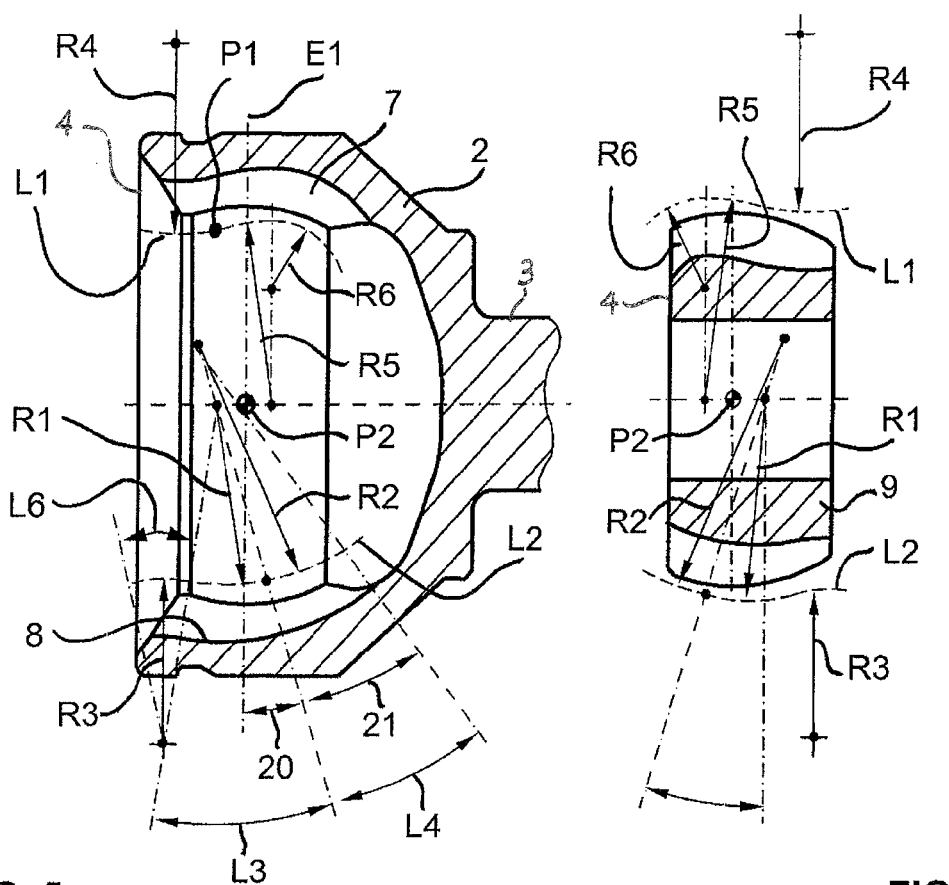
FIG. 5
FIG. 6

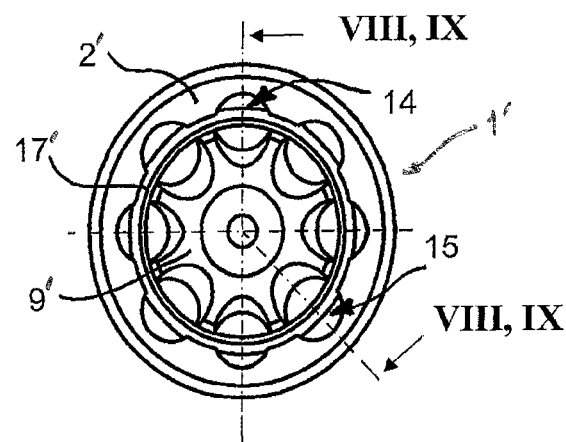
FIG. 7
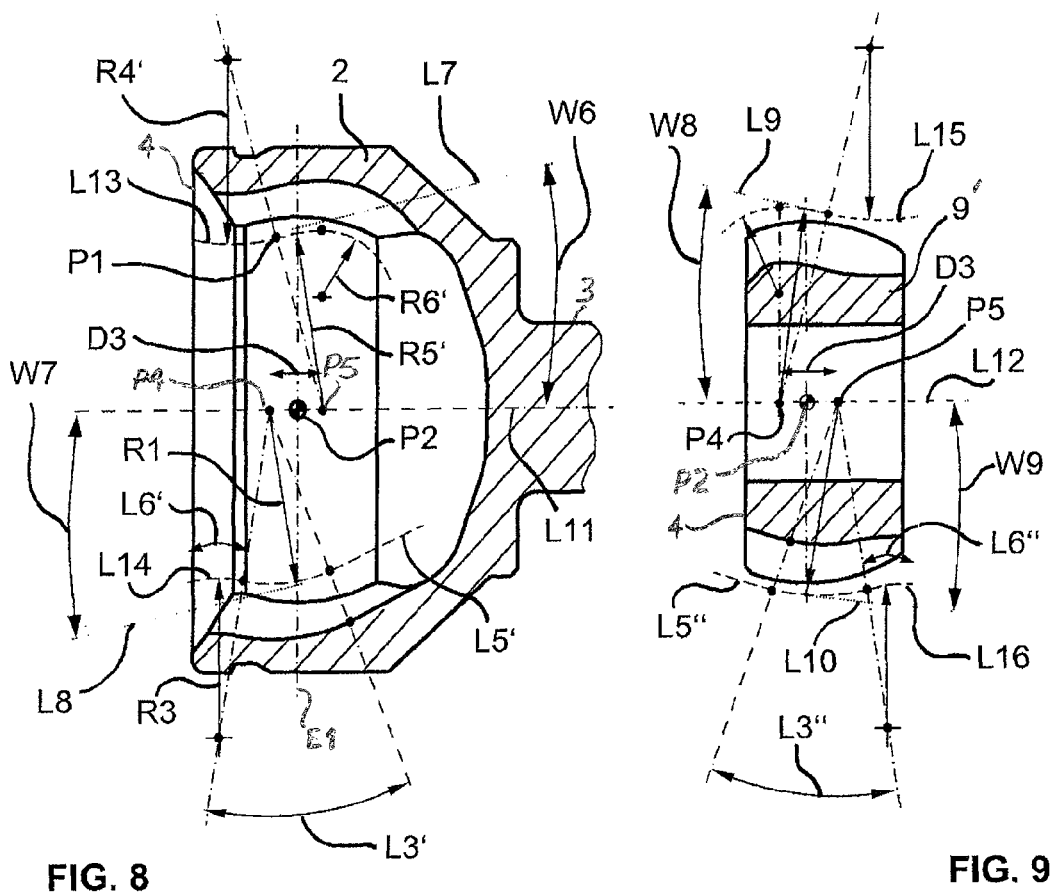
FIG. 8
FIG. 9

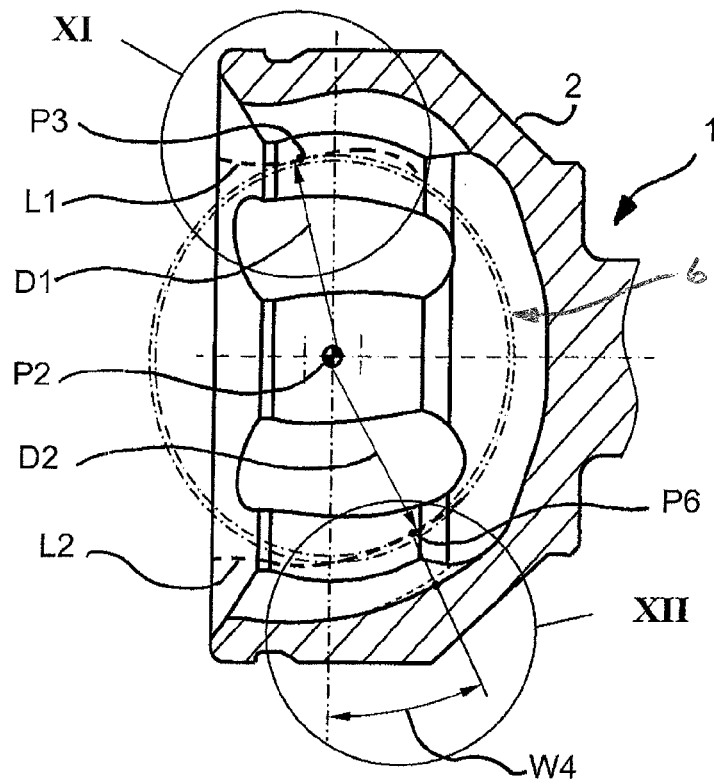
FIG. 10
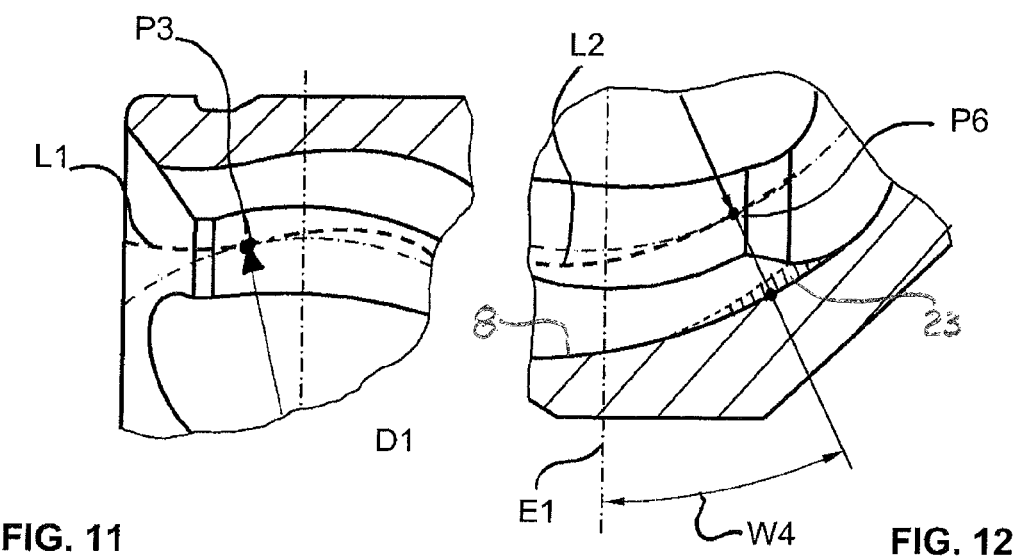
FIG. 11     FIG. 12

CONSTANT VELOCITY BALL JOINT IN THE FORM OF A COUNTER TRACK JOINT

CROSS-REFERENCE TO RELATED APPLICATION

This application is a National Stage application that claims the benefit of International Application No. PCT/EP2006/009893, filed Oct. 13, 2006, which is hereby incorporated by reference in its entirety.

BACKGROUND AND SUMMARY

The present device relates to a counter track joint. The joint may include an outer joint part, an inner joint part, a plurality of torque transmitting balls and a cage. Different designs of track pairs may be formed with the outer joint part and inner joint part, which form opening angles on opposite sides of the constant velocity ball joint.

Counter track joints of this type are disclosed generally in DE 102 20 711 A1, which describes joints with six balls or eight balls. Here the type of ball tracks corresponds to a type known as a Rzeppa joint (RF joints) and from the undercut-free joints (UF joints). This means that the centerlines of the ball tracks consist of uniform radii (RF joint) or that they are composed of radii and parallax lines (UF joint).

In the counter track joints described in DE 102 20 711 A1, the axial opening directions of the track pairs may vary along the circumference. However, the articulation angle of these counter track joints is generally limited to approximately 45°. Articulation angles in excess of 45° may allow a first ball to escape from the first track pairs in the joint articulation plane.

DE 103 37 612 A1 also describes ball track joints in which the track centerlines of the first track pairs (which have an opening angle whose direction of opening points towards the bottom of the joint when the joint is extended) are designed so that the opening angle has its direction of opening reversed from a certain articulation angle when the joint is bent. This is realized in particular in that the track centerlines of the ball tracks of the first track pairs are S-shaped, and therefore include an inflection point.

DE 100 60 220 A1 describes counter track joints in which the centerlines of the first outer ball tracks close to the joint opening have an inflection point so that the centerlines of the first outer ball tracks are S-shaped. In terms of symmetry, the same is true for the centerlines of the first inner ball track of the inner joint part. The maximum articulation angle of these counter track joints may therefore be further increased.

Reference is also made to a counter track joint with a track inflection point, as described in WO 2006/048032. The counter track joint configuration described therein may reduce the friction between the ball cage and the outer joint part or inner joint part. For this purpose it is proposed that the track centerlines of the first track pairs each have an inflection point and that the center angle at the inflection points, related to the central joint plane, be greater than 4 degrees. This helps ensure that the joint operates as a counter track joint in service life operation. Service life operation is considered to be operation within the service life angle at which the service life of the joint is reached without damage under variable load.

In particular applications, however, such constant velocity ball joints are subject to high loads. For example, it may happen that they are installed so that a certain articulation angle is achieved with the constant velocity ball joint even when the motor vehicle is not turning, due to a larger than usual suspension travel. For these particular applications it is important, on the one hand, to provide large articulation angles, but on the other, to provide a suitable service life even where the articulation angle varies within a wide range.

The present device provides a constant velocity ball joint that can be operated reliably and continuously with a large articulation angle. The constant velocity ball joint provides a small design, low heat development during operation, and quiet running.

The constant velocity ball joint may include an outer joint part that has a connection side, an opening side and a cavity bounded by an inner surface, as well as first outer ball tracks and second outer ball tracks extending on the inner surface between the connection side and the opening side. The constant velocity joint may also include an inner joint part that is positioned in the cavity of the outer joint part and has connection means for a shaft running in the direction of the opening side of the outer joint part, and first inner ball tracks and second inner ball tracks extending on an outer surface. A first outer ball track and a first inner ball track each form a first track pair, and a second outer ball track and a second inner ball track each form a second-track pair. When the constant velocity ball joint is not articulated, the first track pairs form a first opening angle in a central joint plane relative to the connection side of the outer joint part, and the second track pairs form a second opening angle in the central joint plane relative to the opening side of the outer joint part. A ball may be disposed in each track pair. A cage, which is also arranged in the cavity between the outer joint part and the inner joint part, has a plurality of cage windows, each of which may receive at least one ball. The first track pairs each form a first track centerline that has a first inflection point, and the second track pairs each form a second track centerline that has a path other than a circular path in a section between the central joint plane and the connection side.

The constant velocity ball joint is, in particular, a joint in the manner of a so-called counter track joint. Here full use can be made, in particular, of the introductory statements regarding the prior art and the explanations contained therein for defining the counter track joint.

Regarding the outer joint part, it should be noted that this is generally of a bell-shaped design, the side from which the cavity can be reached representing the opening side. The axially opposing side is generally referred to as the connection side.

While the cavity has a shape that generally corresponds to that of a bell, an even number of outer ball tracks are generally arranged on its inner surface, for example six, eight, ten or even twelve. These ball tracks are inserted in the manner of recesses in the outer joint part, starting from the cavity. Consideration must now be given to the fact that these ball tracks have two different designs, which is why they are called first and second outer ball tracks. The first ball tracks and the second ball tracks may be alternately arranged in the circumferential direction of the outer joint part.

The inner joint part may be generally designed in the manner of a hub and is provided in the central region with an opening into which a shaft, for example, can be inserted for transmitting a torque. The opening may also be configured to include a keyway connection, or the like, to the shaft. Moreover, the inner joint part has a relatively complexly shaped outer surface into which ball tracks running substantially in an axial direction also extend. The number of inner ball tracks corresponds to the number of outer ball tracks, wherein the relative association of the first and second ball tracks is also predetermined.

With the inner joint part arranged in the cavity of the outer joint part when the constant velocity ball joint is not articulated (articulation angle=0°), it can be seen, in different sectional planes through the longitudinal axis of the outer joint part on the one hand, and the ball tracks on the other, that a first outer ball track and a first inner ball track each form a track pair, as do a second outer ball track and a second inner ball track. A constant velocity ball joint arranged in a non-articulated position may also be described as being axially extended or having aligned axes of the outer joint part and the shaft.

Tangents to the points of the ball tracks that lie within a central joint plane arranged perpendicular to a longitudinal axis of the outer joint part, which runs through the joint center, form an opening angle. The opening angle refers, in particular, to the direction in which the angle opens. The first track pairs form an opening angle to the connection side, and the second track pairs form an opening angle to the opening side.

The track pairs each receive balls transmitting a torque. The term "ball" is used as a generic term for all suitable torque transmitting bodies. The cage, which is positioned between the outer and inner joint parts, serves at least temporarily, during the operation of the joint, to guide the balls in the track pairs. The cage normally has as many cage windows as it receives balls, but it is also possible for a plurality of balls, for example two, to be arranged in a cage window.

To achieve an extremely large articulation angle, the first track pairs may include a first inflection point relative to their track centerline. In particular, the track centerline may have an S-shape. This allows material of the outer joint part close to the opening side to be removed while allowing the balls to remain in contact with the inner region of the outer joint part across a larger articulation angle.

At a particularly large articulation angle, in which the balls in the first track pairs are displaced substantially outwards, there is a corresponding very large inward displacement of the balls into the second track pairs. In this case, increased noise development, or even a risk of component failure, has been observed in prior constant velocity ball joints in the durability range under high load. To help prevent this from occurring, the second track pairs each form a second track centerline that has a path other than a singular circular path in a section between the central joint plane and the connection side. This allows the second track centerline to be adapted in this region to correspond to the shape of the first track pairs close to the opening side. Among other things, this also means, if necessary, that as the outer joint part expands close to the opening side, a correspondingly increasing deepening of the outer, in particular opposing, other ball tracks takes place in the region of the connection side. It is possible in this way to alter the path of the track centerlines, which normally follows a singular circular path close to the connection side of the outer joint part in previous constant velocity ball joints. Here it is possible that at least one further radius of curvature and/or one further straight line section form part of the track centerlines in this section. This allows the reduction in the depth of the outer ball track to be reduced in the direction of the connection side, stopped, or is at least partially changed to an increase in depth.

The second track centerline may have at least a first arc section with a first radius of curvature and a second arc section with a second radius of curvature. Consequently, the variant is described here which is designed without a straight section and, in particular, with only exactly two different arc sections. In this case the first arc section may extend beyond the central joint plane, wherein the second curvature radius section connects tangentially.

In one variant, the second radius of curvature of the second arc section is greater than the first radius of curvature. The radii of curvature have the same orientation and the curvature sections are each seen as concave from one side of the second track centerline.

However, it is also possible for the second arc section to have a second radius of curvature that has an orientation different from the first radius of curvature. The second track centerline in this section therefore has a concave and a convex partial section. In this particular case the second radius of curvature may be smaller than the first radius of curvature.

According to a one configuration of the constant velocity ball joint the second track centerline may have in this section at least a first arc section with a first radius of curvature and a straight line section. Under certain circumstances it may be easier to manufacture such a straight line section in terms of series production of such constant velocity ball joints while at the same time taking advantage of a larger contact angle of the balls and/or greater track depth. The straight line section connects tangentially to the first arc section.

A first small distance point of the first track centerline and a joint center forms a first smallest distance and a second small distance point of the second track centerline and the joint center forms a second smallest distance, wherein the following ratio is maintained:

$$0.95 < \text{second smallest distance/first smallest distance} < 1.0.$$

If this ratio is maintained, an adequate contact angle of the outer joint part around the balls may be achieved in the second outer ball track, even at the maximum articulation angle. The small distance points of each track centerlines are located at a point where a circle around the joint center with the smallest radius forms a single tangent point (i.e., the small distance points) with the respective track centerline. A corresponding ratio is given with regard to the respective base lines of the outer ball tracks.

The second track centerline in the section may have at least two partial sections with a constant path, wherein the first partial section connecting to the central joint plane is smaller than the second partial section close to the connection side of the outer joint part. This indicates the articulation angle at which a modification of the second track centerline will take place.

The second partial section begins close to the connection side in the region of the balls when the opposing balls are positioned at the inflection point of the first outer ball track. The second partial section may be at least twice as large as the first partial section.

The constant velocity ball joint described herein may be used in a motor vehicle, for example, or any other device employing a constant velocity ball joint.

Since the track centerlines are determined essentially by the contour of the outer joint part and inner joint part, the various features of the device can therefore also be demonstrated on the component parts and the parts correspondingly characterized.

Another aspect of the constant velocity ball joint relates to an outer joint part that has a connection side, an opening side and a cavity bounded by an inner surface. The constant velocity ball joint may also have first outer ball tracks and second outer ball tracks extending on the inner surface between the connection side and the opening side. A first outer tangent on the first outer ball tracks forms a third opening angle in a central joint plane with a first longitudinal axis of the outer joint part relative to the connection side, and a second outer tangent on the second outer ball tracks forms a fourth opening angle in a central joint plane with the first longitudinal axis of the outer joint part relative to the opening side. The second outer ball tracks each form a second outer contour line which has a path other than a circular path in a section between the central joint plane and the connection side.

While account is taken, with regard to the constant velocity ball joint, of the opposing ball tracks of a track pair in the sectional plane of the joint center, only the tangent in the outer ball trajectory and the longitudinal axis of the outer joint part are considered here. In this case the third opening angle does not normally coincide with the first angle, but represents an independent feature of the outer joint part. For an explanation it is also pointed out that a contour line refers, in particular, to the track baseline or a line running parallel with it, for example that of the ball center if this passes the track baseline.

The constant velocity ball joint may have an inner joint part that includes connection means for a shaft running in the direction of the opening side of the outer joint part, as well as first inner ball tracks and second inner ball tracks extending on an outer surface. A first inner tangent on the first inner ball tracks forms a fifth opening angle in a central joint plane with a second longitudinal axis of the inner joint part relative to the connection side, and a second inner tangent on the second inner ball tracks forms a sixth opening angle in a central joint plane with the second longitudinal axis relative to the opening side. The second inner ball tracks each form a second inner contour line that has a path other than a circular path in a section between the central joint plane and the opening side.

The path of the contour line relative to the inner joint part is essentially mirror symmetrical to that of the outer joint part, since the opposite sides of the outer and inner joint parts are in contact with the ball when the constant velocity ball joint is deflected. The contour lines of the outer and inner joint parts may not, however, overlap in full mirror symmetry due to minor deviations that may be required to achieve sufficient tolerance or clearance for the balls inside the track pair during the operation of such a constant velocity ball joint.

BRIEF DESCRIPTION OF THE DRAWINGS

FIG. 4 shows a plan elevational view of the exemplary constant velocity ball joint.

FIG. 5 shows a cross-sectional view through an outer joint part of the exemplary constant velocity ball joint taken along section line V-V of FIG. 4.

FIG. 6 shows a cross-sectional view through an inner joint part of the exemplary constant velocity ball joint taken along section line VI-VI of FIG. 4.

FIG. 7 shows plan elevational view of an alternately configured exemplary constant velocity ball joint.

FIG. 8 shows a cross-sectional view through an outer joint part of the exemplary constant velocity ball joint of FIG. 7, taken along section line VIII-VIII.

FIG. 9 shows a cross-sectional view through an inner joint part of the constant velocity joint of FIG. 7, taken along section line IX-IX.

FIG. 10 shows an alternately configured outer joint part.

FIG. 11 shows a detail of region XI of FIG. 10.

FIG. 12 shows a detail of region XII of FIG. 11.

DETAILED DESCRIPTION

Figure 1:
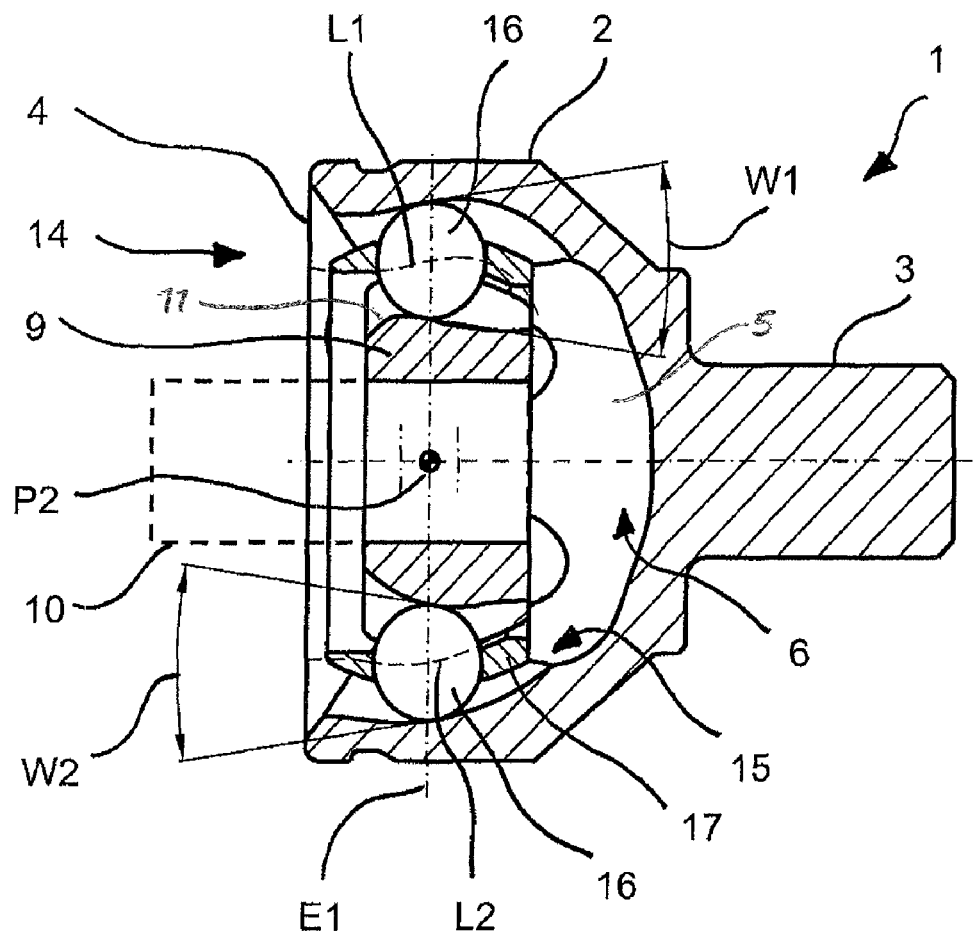
FIG. 1 shows an exemplary constant velocity ball joint in the form of a counter track joint.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present device. Further, the descriptions set forth herein are not intended to be exhaustive or otherwise limit or restrict the claims to the precise forms and configurations shown in the drawings and disclosed in the following detailed description.

FIG. 1 illustrates the principle structure of an exemplary constant velocity ball joint 1. The constant velocity ball join includes an outer joint part 2 and balls 16, a cage 17 and an inner joint part 9, which may be connected to a shaft 10. The torque is transmitted by balls 16 from the inner ball tracks to the outer ball tracks.

Outer joint part 2 includes a connection side 3 and an opening side 4. A cavity 6, which here has an essentially bell-shaped design, extends from opening side 4 to inner regions of outer joint part 2. In addition, a plurality of outer ball tracks are incorporated on inner surface 5 of outer joint part 2, wherein two different types of ball tracks are present in constant velocity ball joint 1, in the nature of a counter track joint, as explained below in detail. The cut outer ball tracks of outer joint part 2 may have a different contour at the top and bottom.

Inner joint part 9, when assembled, is positioned in cavity 6. Ball tracks, referred to here as "inner" ball tracks, are correspondingly incorporated on an outer surface 11, which is therefore formed in the direction of outer joint part 2. Inner joint part 9 is arranged so that the first outer ball tracks and the first inner ball tracks oppose each other radially, and hence form a first track pair 14. Because the outer and inner joint parts have the same structure in terms of the first and second ball tracks, the same applies to second track pairs 15.

The orientation of an opening angle of each track pair may be used to characterize the counter track joint. In the extended position of constant velocity ball joint 1 (as shown in FIG. 1 with a articulation angle=0°), first track pairs 14 (shown at the top of FIG. 1) form a first opening angle W1 in a central joint plane E1 as far as connection side 3 of outer joint part 2. Second track pairs 15 (shown at the bottom of FIG. 1), on the other hand, form a second opening angle W2 in central joint plane E1 as far as opening side 4 of outer joint part 2. Such an opposed orientation of opening angles W1, W2 causes the forces acting on balls 16 to act as far as connection side 3 on the one hand, and as far as opening side 4 on the other. This provides stabilization of the path of movement and guidance of balls 16 without excessive loading of cage 17.

If inner joint part 9 is now offset, by shaft 10, for example, the centers of the balls 16 run on a track centerline in each track pair. In this case a first track centerline L1 is characterized in terms of first track pair 14, just as a second track centerline L2 is illustrated in the lower half of FIG. 1 in second track pair 15. The details of the section close to connection side 3 of second track centerline L2 are described subsequently.

Figure 2:
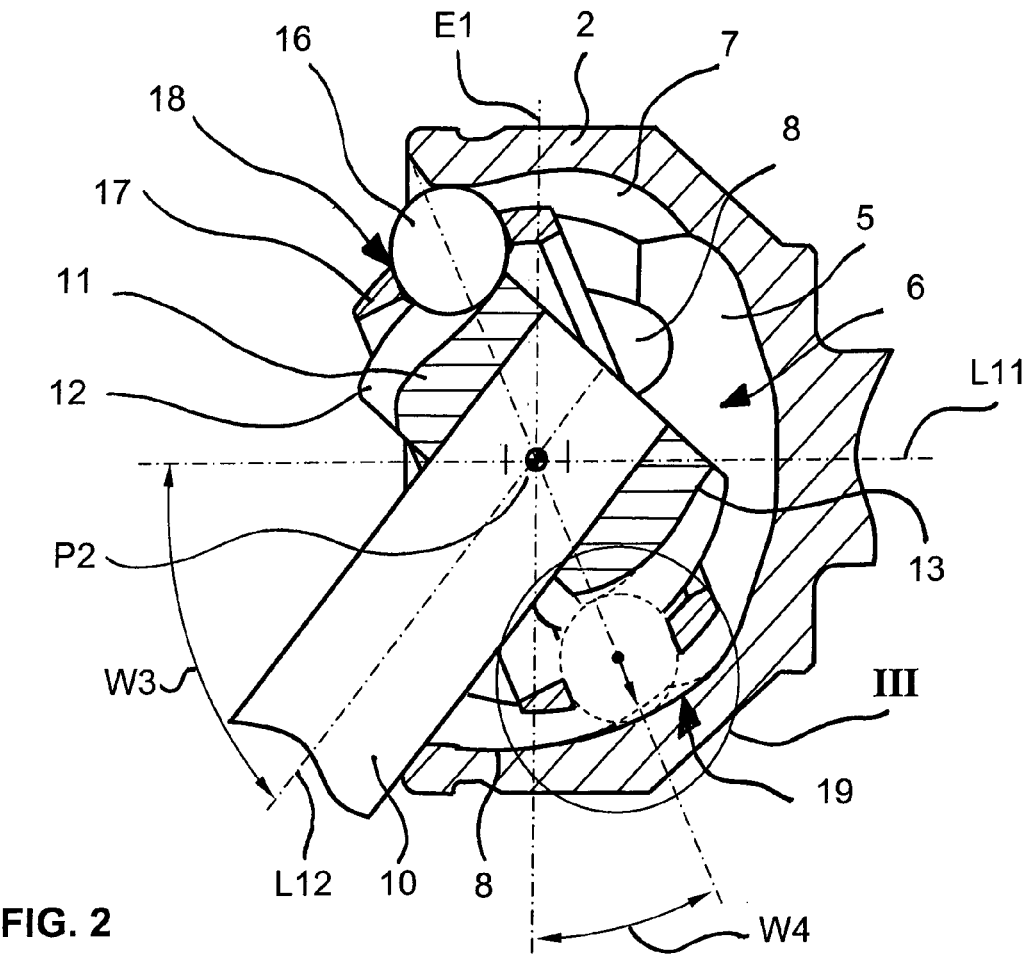
FIG. 2 shows the exemplary constant velocity ball joint with an articulated inner joint part.

FIG. 2 shows constant velocity ball joint 1 arranged in an offset position. In particular, the position assumed by the components of constant velocity ball joint 1 when a maximum articulation angle W3 is reached is illustrated in FIG. 2. At maximum articulation angle W3, there is, in particular, contact between shaft 10 and outer joint part 2. The balls 16 are still be safely guided in the ball tracks concerned with the joint arranged at the maximum articulation angle W3. A variation in the articulation angle, which is formed between a first longitudinal axis L11 of outer joint part 2 and a second longitudinal axis L12 of inner joint part 9, causes balls 16 to move in the ball tracks. A position is now shown where ball 16 shown at the top of FIG. 2 is guided by a first outer ball track 7 of outer joint part 2, a first inner ball track 12 of inner joint part 9 and, if necessary, also by cage 17 (which has a cage window 18 for receiving balls 16). On the opposite side of the joint, a ball 16 is correspondingly guided by a second outer ball track 8 of outer joint part 2, a corresponding second inner ball track 13 of inner joint part 9 and, if necessary, by cage 17.

With reference to the detail denoted by III in FIG. 2, second track centerline has a path other than a singular circular path in the section 19 between the central joint plane E1 and the connection side 3. The path of second outer ball track 8 or second inner ball track 13 originally following a circular path is represented by dotted lines.

Figure 3:
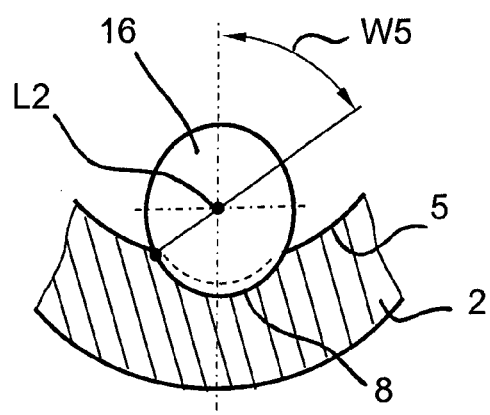
FIG. 3 shows a partial cross-sectional view of region III of FIG. 2.

With reference to FIG. 3, the contact of ball 16 may be varied by altering the path of second outer ball track 8 so that a contact angle W5 is increased. The contact angles in the first and second outer ball tracks fulfill the following condition: 0.85< second contact angle W5/first contact angle<1.0. This improves, in particular, the lateral guidance of ball 16, which may be advantageous where high torques are to be transmitted at a very large articulation angle.

Although other means are known to generally increase the depth of the outer ball track, the exemplary constant velocity joint has a number of advantages. For example, it is also possible to increase the radius of the second track centerline over its complete extent. But this would result in a so called radial offset of the center of said radius, an adjustment of the second track centerline near the opening side, and may finally lead to a bigger joint to ensure a sufficient wall thickness of the outer joint part. To help prevent instabilities and to provide a joint with a very high endurance limit, the non-circular run of the second track centerline (and therefore the corresponding base line) in the given section may be beneficial.

FIG. 4 shows a plan elevation viewed from opening side 4 of an alternately configured constant velocity ball joint 1. The constant velocity ball joint comprises outer joint part 2 and inner joint part 9 between which are arranged first track pairs 14 and second track pairs 15, alternately and regularly spaced relative to each other. Balls 16 positioned in the track pairs are maintained in position by cage 17. The configuration of constant velocity ball joint 1 shown in FIG. 4 is a joint which is constructed with six track pairs so that first track pairs 14 and second track pairs 15 oppose each other. The structure of outer joint part 2 and inner joint part 9 is illustrated with reference to FIGS. 5 and 6.

FIG. 5 shows a section along the plane denoted by section line V-V in FIG. 4. In this sectional view, outer joint part 2 includes first outer ball track 7, shown at the top of FIG. 5, and a second outer ball track 8, shown at the bottom of FIG. 5. Second track centerline L2, is shown at a certain distance from the track base of second outer ball track 8. Second track centerline L2 has an S-shape where essentially three arc sections are identifiable, which sections pass into each other. Here, viewed from a joint center P2, a convex third arc section L6 is first formed, followed by a first arc section L3, then a second arc section L4, this list being applicable in the direction from opening side 4 to connection side 3 of outer joint part 2. Also viewed from joint center P2, convex third arc section L6, with a third radius of curvature R3, is first formed here. The subsequent first curvature section L3 has a first radius of curvature R1, so that a concave first arc section L3 is formed which extends beyond central joint plane E1. In this case first radius of curvature R1 is quantitatively larger, but it is positioned in an orientation other than third radius of curvature R3. The proportion of second track centerline L2, which extends in the region between central joint plane E1 and connection side 3, is divided into a first partial section 20 and a second partial section 21. In first partial section 20 second track centerline L2 still has first radius of curvature R1. This is now followed by second curvature section L4 over a second partial section 21, which is also concave and has a second radius of curvature R2. Quantitatively, second radius of curvature R2 is in this case greater than radius of curvature R1.

Opposing first track centerline L1 also has a similar structure. Viewed from opening side 4, first track centerline L1 first comprises an arc section that is convex relative to joint center P2, with a radius of curvature R4, together with two concave arc sections with a radius of curvature R5 and a radius of curvature R6. First track centerline L1 is therefore designed so that it has a first inflection point P1 roughly in the position shown in FIG. 5.

FIG. 6 shows corresponding inner joint part 9. The arc sections relating to inner joint part 9 correspond essentially to the structure of outer joint part 2, but are designed with mirror symmetry because of the mutual distortions in the constant velocity ball joint. If consideration is given to second track centerline L2, for example, the arrangement of the arc sections is such that starting with opening side 4, second radius of curvature R2 initially, then first radius of curvature R1, and finally third radius of curvature R3, each form an arc section of second track centerline L2. First track centerline L1 is again shown on the opposite side. This is now formed from opening side 4, initially with sixth radius of curvature R6, then with fifth radius of curvature R5, and finally with fourth radius of curvature R4.

FIG. 7 shows a corresponding structure in the case of a constant velocity ball joint 1' with eight track pairs. The basic arrangement of an outer joint part 2', a cage 17' and an inner joint part 9' are illustrated in FIG. 7. First track pairs 14 and second track pairs 15 formed thereby no longer lie directly diametrically opposed to each other, but because of the even number of different track pairs they are offset by one position. To illustrate the structure of first track pairs 14 and second track pairs 15 in a figure, the section through this constant velocity ball joint 1 is angled, as shown in FIG. 7.

FIG. 8 shows a corresponding outer joint part 2'. In the nature of a counter track joint, a tangent L7, together with first longitudinal axis L11, forms a third opening angle W6 directed toward connection side 3 at the intersection of first contour line L13 with central joint plane E1. Similarly opposing second contour line L14, together with a tangent at the intersection with central joint plane E1 and first longitudinal axis L11, forms a fourth opening angle W7, which opens toward opening side 4.

In the configuration illustrated in FIG. 8, second curvature line L14 is not formed with three arc sections but, viewed from opening side 4, with a third arc section L6', a first arc section L3' and a straight line section L5'.

The structure of outer contour line L13 corresponds essentially to that of the first track centerline shown in FIG. 5, so that three arc sections are again formed here.

With regard to radii of curvature R3 and R1, and radii of curvature R4', R5' and R6', first and second angle centers P4, P5 can be determined on first longitudinal axis L11, wherein these are arranged with an offset D3 relative to each other, and wherein these angle centers P4, P5 are arranged relative to joint center P2, particularly on one side.

First contour line L13 and second contour line L14 of constant velocity ball joint 1' correspond essentially to first track centerline L1 and second track centerline L2 of constant velocity ball joint 1, as shown in FIG. 1, but in the case of constant velocity ball joint 1' there may be minor differences in terms of the amount required to set a defined clearance of balls 16 in the track pairs. For this reason the radii of curvature are designated slightly different with respect to constant velocity ball joint 1'.

Constant velocity ball joint 1' also includes an inner joint part 9', which is illustrated in the section in FIG. 9. The mirror symmetrical structure of a first inner contour line L15 can be seen relative to first outer contour line L13 (as shown in FIG. 8), and that of a second inner contour line L16 relative to second outer contour line L14 (as shown in FIG. 8). A first inner tangent L9 and a second inner tangent L10 each form, with a second longitudinal axis L12 of inner joint part L9, a fifth opening angle W8 and a sixth opening angle W9 respectively, which angles are orientated in different directions, namely mirror symmetrical to the opening angles in the same track pairs of outer joint part 2'. With regard to second inner contour line L16, shown at the bottom of FIG. 9, straight line section L5", first arc section L3" and third arc section L6" follow each other from opening side 4. First inner contour line L15, which has the different arc sections viewed from opening side 4, as already explained with reference to FIG. 6, is illustrated opposite second inner contour line L16.

FIG. 10 shows a sectional view through a constant velocity ball joint 1, wherein all the components positioned in a cavity 6 of an outer joint part 2 have been removed. This figure illustrates a first smallest distance D1 from joint center P2 to first small distance point P3 of first track centerline L1, and second smallest distance D2 from joint center P2 to second small distance point P6 of the second track centerline L2 at a position with half of the maximum articulation angle W4. With regard to first distance D1 and second distance D2, the following ratio is applicable in particular: 0.95<D2/D1<1.0.

The detail denoted by XI in FIG. 10 is again shown in FIG. 11, which illustrates the location of first small distance point P3 relative to first track centerline L11. First small distance point P3 defines first smallest distance D1 with joint center P2.

The detail denoted by XII in FIG. 10 is again shown in FIG. 12, which illustrates the location of second small distance point P6 of a ball (not shown) with half a articulation angle W4 from central joint plane E1. The second outer ball track 8 is designed with a recess 23 at this point, which is indicated by shading in FIG. 12.

Figure 13:
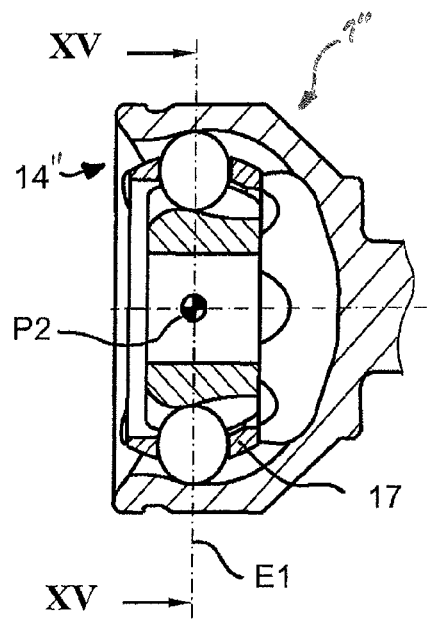
FIG. 13 shows a plan elevational view of an alternately configured exemplary constant velocity ball joint.
Figure 14:
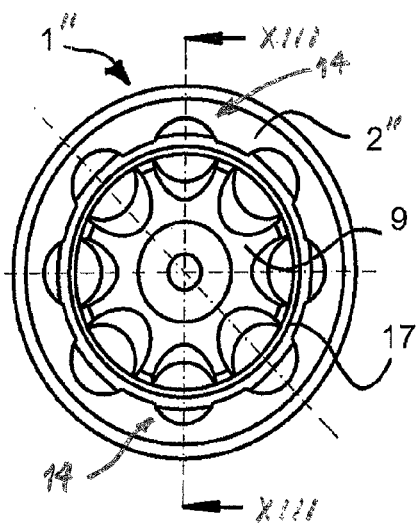
FIG. 14 shows a cross-sectional view through the constant velocity ball joint of FIG. 13, taken along section line XIV-XIV.
Figure 15:
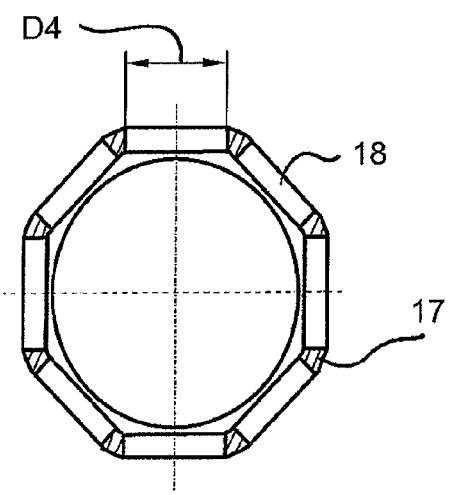
FIG. 15 shows a cross-sectional view through a cage of the constant velocity ball joint of FIG. 13, taken along section line XV-XV.
Figure 16:
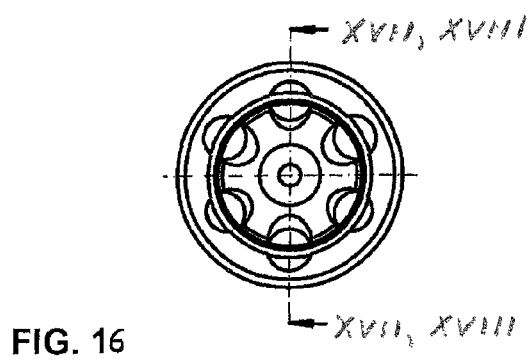
FIG. 16 shows a plan elevational view of an alternately configure exemplary constant velocity ball joint.
Figure 17:
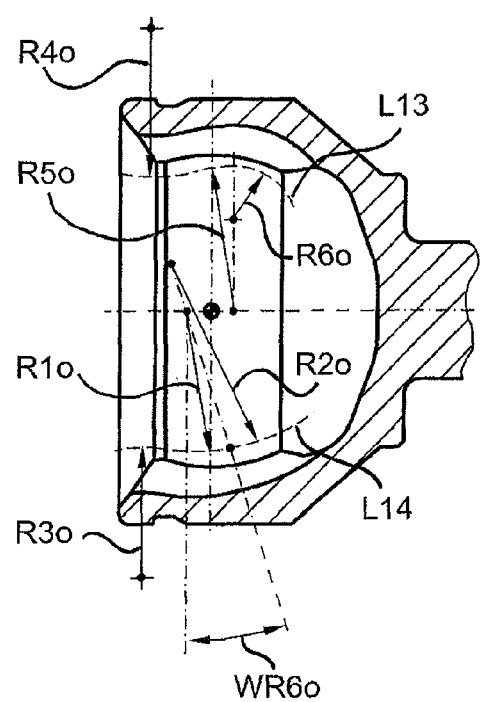
FIG. 17 shows a cross-sectional view through an outer joint part taken along section line XVII-XVII of FIG. 16.
Figure 18:
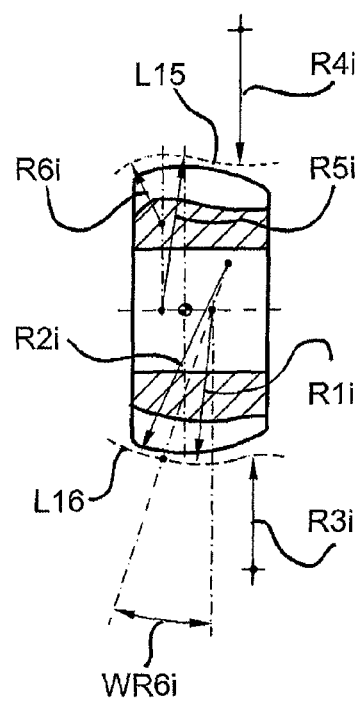
FIG. 18 shows a cross-sectional view through an inner joint part taken along section line XVIII-XVIII of FIG. 16.
Figure 19:
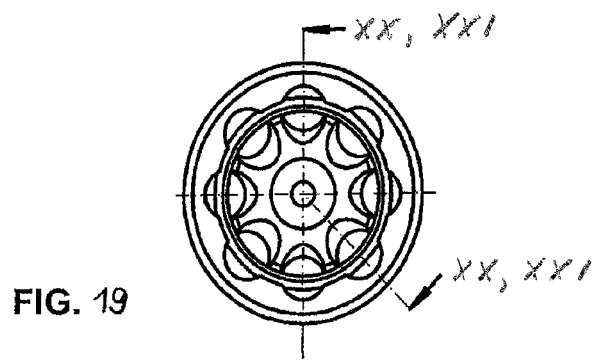
FIG. 19 shows a plan elevational view of an alternately configured constant velocity ball joint.
Figure 20:
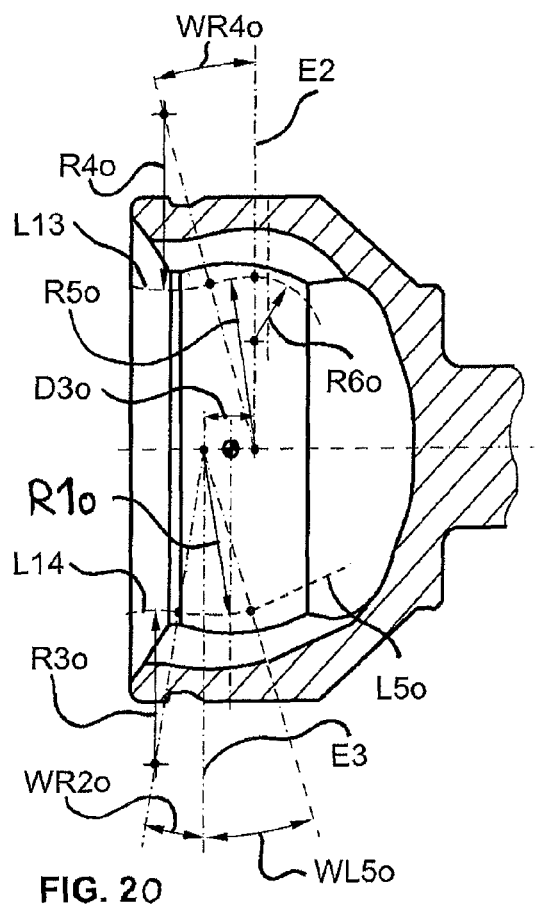
FIG. 20 shows a cross-sectional view through an outer joint part taken along section line XX-XX of FIG. 19.
Figure 21:
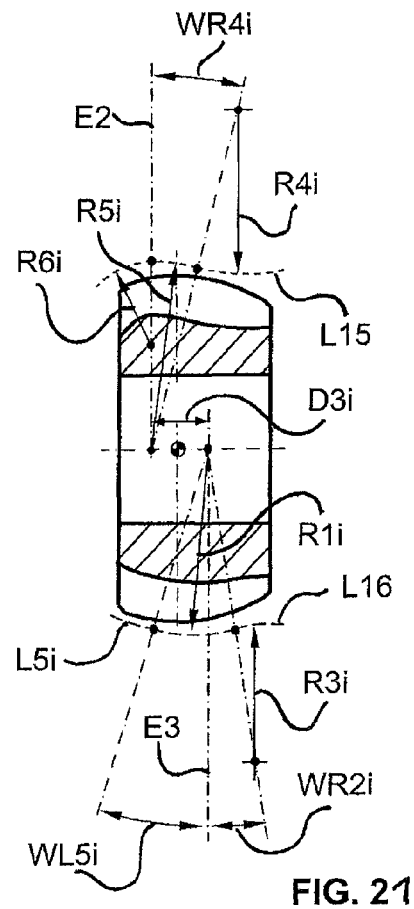
FIG. 21 shows a cross-sectional view through an inner joint part taken along section line XXI-XXI of FIG. 19.

FIGS. 13 and 14 illustrate the composite structure of a constant velocity ball joint 1", comprising an outer joint part 2", a cage 17" and an inner joint part 9", wherein eight track pairs are formed. Here the same track pairs are usually formed so that they are diametrically opposite each other, as shown in FIG. 14. In this representation only first track pairs 14 are formed at the top and bottom. To illustrate cage 17", a further section XV-XV is shown perpendicular to the first longitudinal axis of outer joint part 2" through joint center P2 in FIG. 15. In this configuration, cage 17" includes eight cage windows 18, with a width D4, so that only one ball 16 at a time is guided in a track pair (FIG. 15).

FIGS. 16 to 21 are provided to illustrate the following advantageous dimensions and ratios regarding such a constant velocity ball joint that can be realized accordingly with at least one of the other constant velocity ball joint configurations. The configuration shown in FIGS. 16 to 18 substantially corresponds to the configuration shown in FIGS. 4 to 6 and the configuration of FIGS. 19 to 21 substantially correspond to the configuration shown in FIGS. 7 to 9. Some of reference numbers in the above mentioned figures or the dimensions given below are provided with an addition character or different apostrophes to indicate the relevant joint part, in particular "o" refers to an outer joint part and "i" refers to an inner joint part.

PCD A: Pitch Circle Diameter first track pairs

PCD B: Pitch Circle Diameter second track pairs other Parameter: see list of reference numbers.

Outer joint part:

[[0.5]]0.5 < PCD A/R4(o) < [[1.5]]1.5
[[3.4]] 3.4 < PCD A/R6(o) < [[4.2]]4.2
[[0.5]]1.5 < PCD A/R3(o) < [[1.5]]1.5
[[0.7]]0.7 < PCD A/R2(o) < [[2.0]]2.0
[[6.0]]6.0 < PCD A/D3(o) < [[9.0]]9.0
[[2.6]]2.6 < PCD A/D4 < [[3.2]]3.2
8° < WR4(o) < 14°
6° < WR2(o) < 10°
13° < WR6(o) < 17°
17° < WL5(o) < 21°

Inner joint part:

[[0.5]]0.5 < PCD A/R4(i) < [[1.5]]1.5
[[3.4]]3.4 < PCD A/R6(i) < [[4.2]]4.2
[[0.5]]0.5 < PCD A/R3(i) < [[1.5]]1.5
[[0.7]]0.7 < PCD A/R2(i) < [[2.0]]2.0
[[6.0]]6.0 < PCD A/D3(i) < [[9.0]]9.0
8° < WR4(i) < 14°
6° < WR2(i) < 10°
13° < WR6(i) < 17°
17° < WL5(i) < 21°

Different track PCD of first and second track pairs 0.9<PCD A/PCD B<1.1

The constant velocity ball joint, in the nature of a counter track joint, has first and second track pairs which form an opposite opening angle, wherein the first track pairs are provided with a track inflection point and the second track pairs each form a second track centerline which has a path other than a circular path in a section between the central joint plane and the connection side.

The invention claimed is:

1. Constant velocity ball joint comprising:
an outer joint part including a connection side, an opening side and a cavity bounded by an inner surface first outer ball tracks and second outer ball tracks extending on the inner surface between the connection side and opening side;
an inner joint part-positioned in the cavity of the outer joint part, the inner joint part including connection means for a shaft running in a direction of the opening side of the outer joint part and first inner ball tracks and second inner ball tracks extending on an outer surface of the inner joint part, at least one each of the first outer ball tracks and the first inner ball tracks form first track pairs, and at least one each of the second outer ball tracks and the second inner ball tracks form second track pairs, wherein, when the constant velocity ball joint is not articulated, the first track pairs form a first opening angle (W1) in a central joint plane (E1) relative to the connection side of the outer joint part, and the second track pairs form a second opening angle (W2) in the central joint plane (E1) relative to the opening side of the outer joint part;
a ball in each track pair; and
a cage arranged in the cavity between the outer joint part and the inner joint part, the cage including a plurality of cage windows, each of which receives at least one ball;
wherein the first track pairs each form a first track centerline (L1) that has a first inflection point (P1), and the second track pairs each form a second track centerline (L2) that has a path other than a circular path in a section between the central joint plane (E1) and the connection side.

2. The constant velocity ball joint according to claim 1, wherein the second track centerline (L2) has in the section between the central joint plane (E1) and the connection side at least a first arc section (L3) with a first radius of curvature (R1) and a second arc section (L4) with a second radius of curvature (R2).

3. The constant velocity ball joint according to claim 2, wherein the second arc section (L4) has a second radius of curvature (R2) which is greater than the first radius of curvature (R1).

4. The constant velocity ball joint according to claim 2, wherein the second arc section (L4) has a second radius of curvature (R2) which has an orientation different from the first radius of curvature (R1).

5. The constant velocity ball joint according to claim 4, wherein the second arc section (L4) has a second radius of curvature (R2) which is smaller than the first radius of curvature (R1).

6. The constant velocity ball joint according to claim 4, wherein the straight line section (L5) connects tangentially to the first arc section (L3).

7. The constant velocity ball joint according to claim 2, wherein the second track centerline (L2) has in the section between the central joint plane (E1) and the connection side at least a first arc section (L3) with a first radius of curvature (R1) and a straight line section (L5).

8. The constant velocity ball joint according to claim 1, wherein a first small distance point (P1) of the first track centerline (L1) and a joint center (P2) form a first smallest distance (D1) and a second small distance point (P6) of the second track centerline (L2) and the joint center (P2) form a second smallest distance (D2), wherein the following ratio is maintained:

0.95<second smallest distance (D2)/first smallest distance (D1)<1.0.

9. The constant velocity ball joint according to claim 1, wherein the second track centerline (L2) in the section between the central joint plane (E1) and the connection side has at least two partial sections with a constant path, wherein a first partial section connecting to the central joint plane (E1) is smaller than a second partial section close to the connection side of the outer joint part.

10. The constant velocity ball joint of claim 1, wherein a first outer tangent (L7) on the first outer ball tracks forms a third opening angle (W6) in the central joint plane (E1) with a first longitudinal axis (L11) of the outer joint part relative to the connection side, and a second outer tangent (L8) on the second outer ball tracks forms a fourth opening angle (W7) in the central joint plane (E1) with the first longitudinal axis (L11) of the outer joint part relative to the opening side, wherein the second outer ball tracks each form a second outer contour line (L14) that has a path other than a circular path in a section between the central joint plane (E1) and the connection side.

11. The constant velocity ball joint of claim 1, wherein a first inner tangent (L9) on the first inner ball tracks form a fifth opening angle (W8) in the central joint plane (E1) with a second longitudinal axis (L12) of the inner joint part relative to the connection side, and a second inner tangent (L10) on the second inner ball form a sixth opening angle (W9) in the central joint plane (E1) with the second longitudinal axis (L12) relative to the opening side (4), wherein the second inner ball tracks each form a second inner contour line (L16) which has a path other than a circular path in a section between the central joint plane (E1) and the opening side.

12. A motor vehicle comprising:
at least one constant velocity ball joint, each constant velocity ball joint comprising:
an outer joint part including a connection side, an opening side and a cavity bounded by an inner surface, first outer ball tracks and second outer ball tracks extending on the inner surface between the connection side and opening side;
an inner joint part positioned in the cavity of the outer joint part, the inner joint part including connection means for a shaft running in a direction of the opening side of the outer joint part and first inner ball tracks and second inner ball tracks extending on an outer surface of the inner joint part, at least one each of the first outer ball tracks and the first inner ball tracks form first track pairs, and at least one each of the second outer ball tracks and the second inner ball tracks form second track pairs, wherein, when the constant velocity ball joint is not articulated, the first track pairs form a first opening angle (W1) in a central joint plane (E1) relative to the connection side of the outer joint part, and the second track pairs form a second opening angle in the central joint plane (E1) relative to the opening side of the outer joint part;
a ball in each track pair; and
a cage arranged in the cavity between the outer joint part and the inner joint part, the cage including a plurality of cage windows, each of which receives at least one ball;
wherein the first track pairs each form a first track centerline (L1) that has a first inflection point (P1), and the second track pairs each form a second track centerline (L2) that has a path other than a circular path in a section between the central joint plane (E1) and the connection side.

* * * * *